United States Patent
Dadras et al.

(10) Patent No.: US 11,084,461 B2
(45) Date of Patent: Aug. 10, 2021

(54) VEHICLE DATA PROTECTION

(71) Applicant: Ford Global Technologies, LLC, Dearborn, MI (US)

(72) Inventors: Soodeh Dadras, Sunnyvale, CA (US); Sara Dadras, Palo Alto, CA (US); Han Tang, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 377 days.

(21) Appl. No.: 16/276,891

(22) Filed: Feb. 15, 2019

(65) Prior Publication Data

US 2020/0262393 A1    Aug. 20, 2020

(51) Int. Cl.
```
B60R 25/25     (2013.01)
B60K 35/00     (2006.01)
G06F 21/32     (2013.01)
G06F 21/62     (2013.01)
H04L 29/06     (2006.01)
H04L 29/08     (2006.01)
G06F 21/30     (2013.01)
G07C 9/25      (2020.01)
G07C 9/26      (2020.01)
```

(52) U.S. Cl.
CPC .............. *B60R 25/25* (2013.01); *B60K 35/00* (2013.01); *G06F 21/305* (2013.01); *G06F 21/32* (2013.01); *G06F 21/629* (2013.01); *G07C 9/257* (2020.01); *H04L 63/0861* (2013.01); *H04L 67/125* (2013.01); *B60K 2370/55* (2019.05); *G07C 9/26* (2020.01)

(58) Field of Classification Search
CPC ..... B60R 25/25; B60K 2370/55; G06F 21/32; G06F 21/305; H04L 63/0861; H04L 9/0643; H04W 12/50; G06Q 20/3829
USPC ......................................... 380/270; 340/5.72
See application file for complete search history.

(56) References Cited

U.S. PATENT DOCUMENTS

| | | | |
|---|---|---|---|
| 8,344,849 B2 | 1/2013 | Larsson et al. | |
| 9,988,016 B1* | 6/2018 | Bianchi, III | H04W 12/06 |
| 2013/0307670 A1 | 11/2013 | Ramaci | |
| 2018/0029560 A1* | 2/2018 | Mohaupt | B60R 25/255 |
| 2020/0052905 A1* | 2/2020 | Mathias | H04L 9/3265 |

* cited by examiner

*Primary Examiner* — Vernal U Brown
(74) *Attorney, Agent, or Firm* — Michael Spenner; Brooks Kushman P.C.

(57) ABSTRACT

A vehicle includes one or more controllers, programmed to responsive to detecting a mismatch between a biometric information of a user collected via a biometric sensor and a biometric record, send a lockup signal to a mobile device enrolled with the vehicle to lock an application; and responsive to successfully performing an authentication through an interaction with the application in a lockup mode, send an unlock signal to the mobile device to unlock the application.

20 Claims, 3 Drawing Sheets

VEHICLE DATA PROTECTION

TECHNICAL FIELD

The present disclosure generally relates to a vehicle data protection system. More specifically, the present disclosure relates to a vehicle data protection system using biometric authentication.

BACKGROUND

Many vehicles are provided with infotainment systems allowing a user to remotely access vehicle data and control operations of the vehicle. Software applications may be installed on a mobile device such as a smart phone or tablet of the user. After an initial setup connecting the mobile device to the infotainment system of the vehicle, the user may access vehicle data including location and mileage using the mobile application via a wireless network, such as a cellular network.

SUMMARY

In one or more illustrative embodiment of the present disclosure, a vehicle includes one or more controllers, programmed to responsive to detecting a mismatch between a biometric information of a user collected via a biometric sensor and a biometric record, send a lockup signal to a mobile device enrolled with the vehicle to lock an application; and responsive to successfully performing an authentication through an interaction with the application in a lockup mode, send an unlock signal to the mobile device to unlock the application.

In one or more illustrative embodiment of the present disclosure, a method for a vehicle includes responsive to detecting a mismatch between a biometric information of a user collected via a biometric sensor and a biometric record, locking a remote communication feature and sending a lockup signal to a mobile device enrolled with the vehicle to lock an application; and responsive to successfully performing an authentication through an interaction with the application in a lockup mode, unlocking the remote communication feature and sending an unlock signal to the mobile device to unlock the application.

In one or more illustrative embodiment of the present disclosure, a non-transitory computer-readable medium includes instructions that, when executed by a processor of a vehicle, cause the vehicle to responsive to detecting a mismatch between a biometric information of a user collected via a biometric sensor and a biometric record, lock a remote communication feature and send a lockup signal to a mobile device enrolled with the vehicle to lock an application; and responsive to successfully performing an authentication through an interaction with the application in a lockup mode, unlock the remote communication feature and send an unlock signal to the mobile device to unlock the application.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes a biometric authentication system for a vehicle. More specifically, the present disclosure proposes a biometric authentication system for protecting data from remote access by an unauthorized party.

Figure 1:
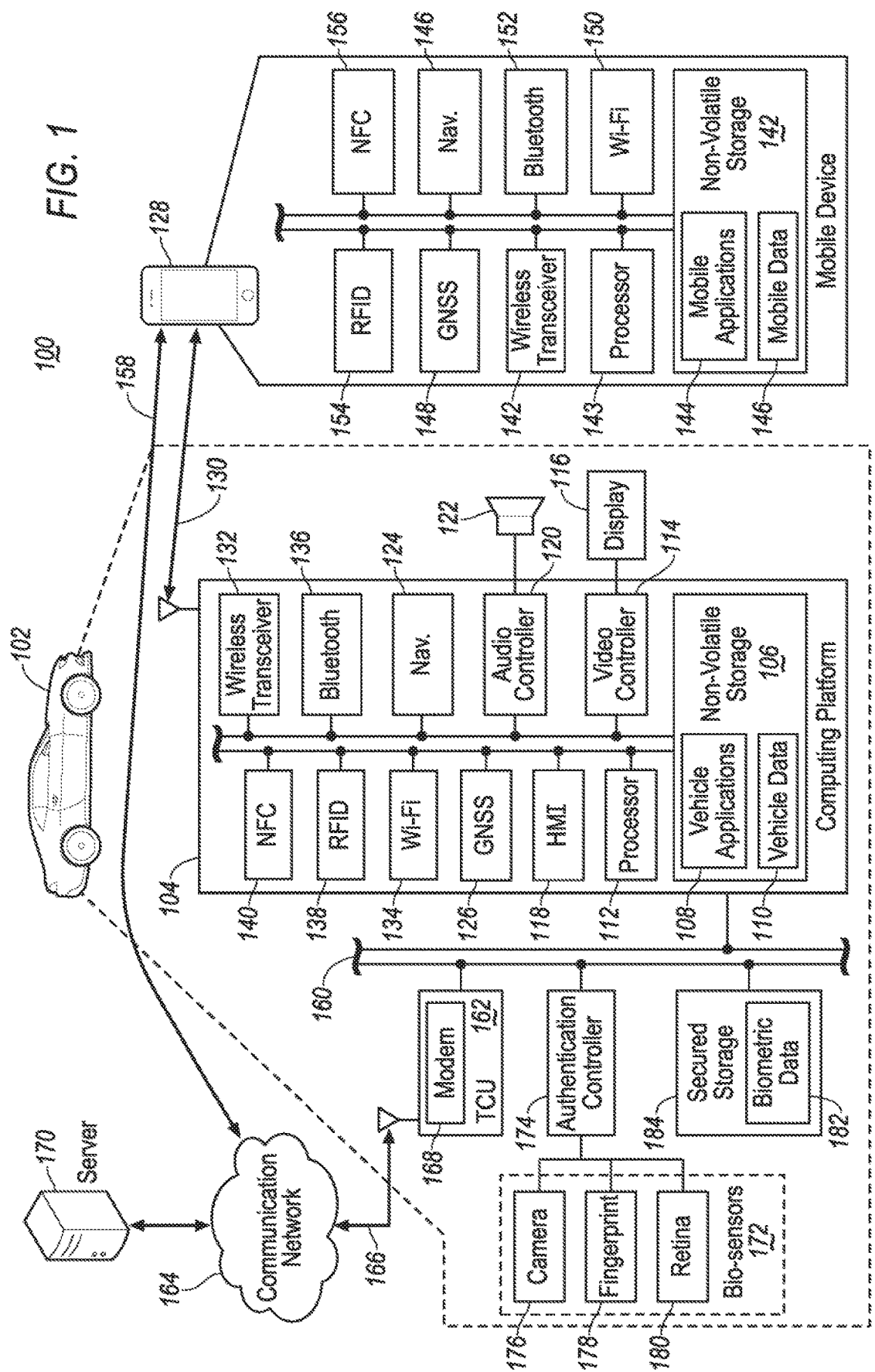
FIG. 1 illustrates an example block topology of a vehicle system of one embodiment of the present disclosure.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be battery electric vehicle (BEV), a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 112 configured to perform instructions, commands, and other routines in support of the processes described herein. For instance, the computing platform 104 may be configured to execute instructions of vehicle applications 108 to provide features such as navigation, user authentication, and wireless communications. Such instructions and other data may be maintained in a non-volatile manner using a variety of types of computer-readable storage medium 106. The computer-readable medium 106 (also referred to as a processor-readable medium or storage) includes any non-transitory medium (e.g., tangible medium) that participates in providing instructions or other data that may be read by the processor 112 of the computing platform 104. Computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 118 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 116 configured to provide visual output to vehicle occupants by way of a video controller 114. In some cases, the display 116 may be a touch screen further configured to receive user touch input via the video controller 114, while in other cases the display 116 may be a display only, without touch input capabilities. The computing platform 104 may also drive or otherwise communicate with one or more speakers 122 configured to provide audio output to vehicle occupants by way of an audio controller 120.

The computing platform 104 may also be provided with navigation and route planning features through a navigation controller 124 configured to calculate navigation routes responsive to user input via e.g., the HMI controls 118, and output planned routes and instructions via the speaker 122 and the display 116. Location data that is needed for navigation may be collected from a global navigation satellite system (GNSS) controller 126 configured to communicate with multiple satellites and calculate the location of the vehicle 102. The GNSS controller 126 may be configured to support various current and/or future global or regional location systems such as global positioning system (GPS), Galileo, Beidou, Global Navigation Satellite System (GLONASS) and the like. Map data used for route planning may be stored in the storage 106 as a part of the vehicle data 110. Navigation software may be stored in the storage 116 as a part of the vehicle applications 108.

The computing platform 104 may be configured to wirelessly communicate with a mobile device 128 of the vehicle users/occupants via a wireless connection 130. The mobile device 140 may be any of various types of portable computing device, such as cellular phones, tablet computers, wearable devices, smart watches, laptop computers, portable music players, or other device capable of communication with the computing platform 104. A wireless transceiver 132 may be in communication with a Wi-Fi controller 134, a Bluetooth controller 136, a radio-frequency identification (RFID) controller 138, a near-field communication (NFC) controller 140, and other controllers such as a Zigbee transceiver, an IrDA transceiver (not shown), and configured to communicate with a compatible wireless transceiver 142 of the mobile device 128.

The mobile device 128 may be provided with a processor 143 configured to perform instructions, commands, and other routines in support of the processes such as navigation, telephone, wireless communication, and multi-media processing. For instance, the mobile device 128 may be provided with location and navigation functions via a navigation controller 146 and a GNSS controller 148. The mobile device 128 may be provided with a wireless transceiver 142 in communication with a Wi-Fi controller 150, a Bluetooth controller 152, a RFID controller 154, a NFC controller 156, and other controllers (not shown), configured to communicate with the wireless transceiver 132 of the computing platform 104.

The computing platform 104 may be further configured to communicate with various components of the vehicle 102 via one or more in-vehicle network 160. The in-vehicle network 160 may include, but is not limited to, one or more of a controller area network (CAN), an Ethernet network, and a media-oriented system transport (MOST), as some examples.

The computing platform 104 may be configured to communicate with a TCU 162 configured to control telecommunication between vehicle 102 and a communication network 164 through a wireless connection 166 using a modem 168. The communication network 164 may be any type of wireless network such as a cellular network enabling the communication between a remote server 170 and the computing platform 104. Additionally or alternatively, the computing platform 104 may be connected to the communication network 164 via the mobile device 128 through a wireless connection 158. It is noted that, the remote server 170 is used as a general term throughout the present disclosure and may refer to any cloud-based services involving multiple servers, computers, devices and the like. The remote server 170 may be configured to perform various operations such as facilitating the communication between the vehicle 102 and wireless devices (e.g. the mobile device 128) via the communication network.

The computing platform 104 may be further configured to communicate with various biometric sensors 172 configured to provide biometric input from a vehicle user by way of an authentication controller 174 via the in-vehicle network 160. The authentication controller 174 may be configured to process and authenticate the biometric input to verify the identity and authorization of a vehicle user operating the vehicle 102. As a non-limiting example, the biometric sensors 172 may include a camera 176 configured to capture a facial image of a vehicle user. The camera 176 may be mounted on a front windshield, on a rear-view mirror or on a dashboard 102 facing toward the cabin to capture facial images of both the driver and passenger of the vehicle 102. Additionally or alternatively, the camera 176 may be mounted at a location (e.g. on the ceiling) allowing to capture facial images on the passengers on the second and third row seats.

The biometric sensors 172 may further include a fingerprint reader 178 configured to scan a fingerprint of a vehicle user. Various independent and/or integrated fingerprint reader implementations may be used. For instance, the fingerprint reader 178 may be an independent fingerprint reader mounted inside the cabin of the vehicle 102 (e.g. on the dashboard) and connected to the authentication controller 174 through a wired or wireless connection. Alternatively, the fingerprint reader 178 may be integrated with other components of the vehicle 102. For instance, the fingerprint reader 178 may be integrated with a steering wheel (not shown) of the vehicle 102 configured to scan a fingerprint and/or a palmprint of the driver when he/she operates the vehicle 102 using the steering wheel. Alternatively, the fingerprint reader 178 may be integrated with a push to start button (not shown) configured to scan the fingerprint of the vehicle user when the user pushes the button to start to use the vehicle 102. Alternatively, the fingerprint reader 178 may be integrated with one or more gear selectors (not shown) configured to scan the fingerprint of the user when he/she touch the gear selector to select the gear and operate the vehicle 102. The gear selector may be implemented in various forms. As a few non-limiting examples, the gear selector may include a stick/lever, a dial, and/or one or more buttons. In case the button gear selector is used, the fingerprint reader may be integrated with one or more buttons, and preferably integrated with the Drive (D) button as in many cases the operator needs to put the vehicle 102 in Drive to operate.

The biometric sensors 172 may further include a retina scanner 180 configured to scan a retina pattern of the vehicle user. Similar to the camera 176, the retina scanner may be placed in front of the vehicle driver e.g. below the rear-view mirror or on the dashboard with an adjustable angle configured to detect an eye of the vehicle user. Alternatively, the retina scanner 180 may be placed on or near a vehicle visor combined with a visor mirror to scan the retina pattern of the vehicle user. Alternatively, the retina scanner 180 may be combined with the camera 176 to scan both the facial image and retina pattern of the vehicle user.

After capturing the biometric information of a vehicle user, the authentication controller 174 may be configured to process the information to generate an encrypted and/or hashed biometric data 182 for that particular vehicle user. The encrypted biometric data 182 may be stored in a secured storage 184 in communication with the authentication controller 174 and the computing platform 104 via the in-vehicle network 160. Alternatively, the secured storage 184 may be integrated with the authentication controller 174, the computing platform 104, and/or other components of the vehicle 102 in various forms such as in the form of a secured chip. In case that the vehicle owner is changed, all the data from the previous owner is deleted from the secured storage 184.

Figure 2:
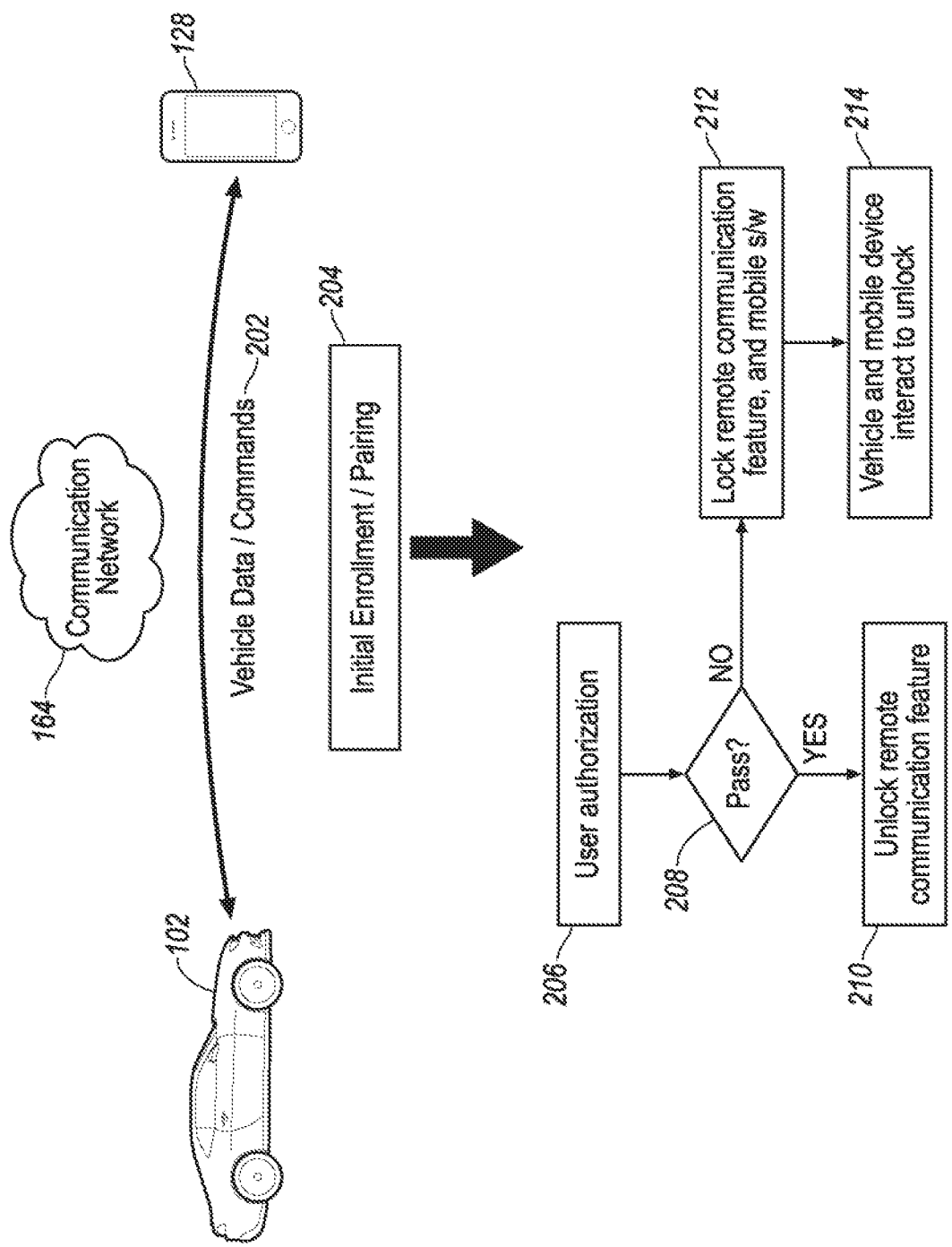
FIG. 2 illustrates an example system diagram of a vehicle data protection system of one embodiment of the present disclosure.

Referring to FIG. 2, a system diagram of a vehicle data protection system 200 of one embodiment of the present disclosure is illustrated. With continuing reference to FIG. 1, the computing platform 104 of the vehicle 102 may be configured to remotely communicate with the mobile device 128 via the communication network 164 to share vehicle data 202 allowing the vehicle user to access the current status of the vehicle 102. For instance, the vehicle data 202 may include vehicle location from the GNSS controller 126, a route from the navigation controller, engine/transmission operation status from various ECUs (not shown), fuel level, tire pressure, odometer, seat belt status, speed, airbag status, emergency events or the like. The mobile device 128 may be provided with software (e.g. as one of the mobile applications 144) configured to communicate with the vehicle 102 to receive the vehicle data. Additionally, the mobile device 128 may be further configured to send vehicle commands 202 to the vehicle 102 to control and monitor various operations of the vehicle 102. For instance, the vehicle commands 202 may operate the vehicle 102 to remote start/stop, send requested information stored in the storage 106, set navigation route, enable/disable features or the like via the mobile application 144.

For security reasons, the mobile device 128 may first need to be enrolled or paired with the computing platform 104 of the vehicle 102 before the remote vehicle data/commands communication feature is enabled. Before enabling the remote communication feature to send and receive data/commands 202 to and from the mobile device 128, the computing platform 104 may be configured to perform an authorization to verify if the user using the mobile device 128 is still authorized to access the vehicle 102. To further enhance the security for data and privacy protection purposes, biometric information may be collected during the initial enrollment and verified each time before the communication feature is unlocked.

During the initial enrollment and pair step 204, the authorization controller 174 and/or the computing platform 104 may be configured to invite a vehicle user to input biometric information via one or more of the biometric sensors 172. After the biometric information of the user is collected and the encrypted biometric data 182 is generated and stored in the secured storage 184, the computing platform 104 may be configured to pair with the mobile device 128 via the wireless connection 130 and associate the mobile device 128 with the biometric data 182 for the specific user. It is noted that the biometric data 182 for the specific user may be associated with one or more mobile devices 128 allowing the user to access the vehicle 102 remotely with various devices at his/her convenience.

Each time before the computing platform 104 enables the communication feature with the mobile device 128, a biometric user authentication 206 may be performed to verify the identity of the current vehicle user. This step may be important to protect the vehicle data 202 from unauthorized access by the mobile device 128 previously paired and enrolled to the computing platform 104 but is no longer authorized to access the vehicle 102. For instance, a user of the vehicle 102 may enroll his mobile device 128 to remotely access the vehicle data 202. After the user sold the vehicle 102 to a new user who fails to disable the remote communication feature via the computing platform 104, the previous user may still have access to the vehicle 102 via the mobile device 128, which is detrimental to the privacy and data protection of the new owner. With the biometric user authorization 206, such an undesired situation may be avoided.

For instance, responsive to detecting a user starts to use the vehicle 102, biometric information of the current user may be collected via one or more of the biometric sensors 172, and verified against the previously generated biometric data 182 of an authorized user. Responsive to detecting a match and the current user passes the authorization 208, the computing platform 104 may unlock the remote communication feature 210 allowing the mobile device to access the vehicle 102. Otherwise, if a mismatch is detected, the computing platform 104 may lock the remote communication feature 212 to suspend all data sharing with any previously authorized device(s). In addition, the computing platform 104 may send a lock signal to the mobile device 128 instructing to lock the remote communication software 144. The computing platform may enter a secondary authorization process 214 to interact with the mobile software 144 in a lockup mode to unlock the remote communication. In the lockup mode, the remote communication feature of the mobile device 128 is disabled and the user may be unable to access data of the vehicle 102 via the mobile application 144. The mobile application 144 may be configured to still enable some features to facilitate the secondary authorization by interacting with the vehicle 102. Details will be introduced below with reference to FIG. 3.

In another embodiment, the vehicle 102 may be a fleet vehicle shared by various users. In this case, biometric data of multiple users may be stored in the vehicle 102. The biometric data may be stored in the secured storage 184 as separate files or divided into different compartments each associated with a specific user. The user authentication operation 206 may be configured into two steps. In the first step, the authorization controller 174 and/or the computing platform 104 may collect the current driver biometric data and verify against the biometric data 182 of multiple users to check for any match. If the answer for the first step is a yes, then in the second step, the authorization controller 174 and/or the computing platform 104 may further identify which user is the current user. Responsive to identify the current user, the computing platform 104 may be configured to just activate vehicle applications 108 and vehicle data 110 associated with current user and lock the applications and data associated with other users until a new user is detected.

The authorization controller 174 and/or the computing platform 104 may be further configure to delete the biometric data 182 from the secured storage responsive to certain predefined conditions being met. If the vehicle 102 is a privately-owned vehicle, in case that the vehicle owner is changed, all the data from the previous owner is deleted from the secured storage 184. On the other hand, for a fleet vehicle shared by multiple users, the biometric data 182 for a user may be deleted when that specific user's authority to use the vehicle 102 terminates (e.g. when the user unsubscribes the service).

Figure 3:
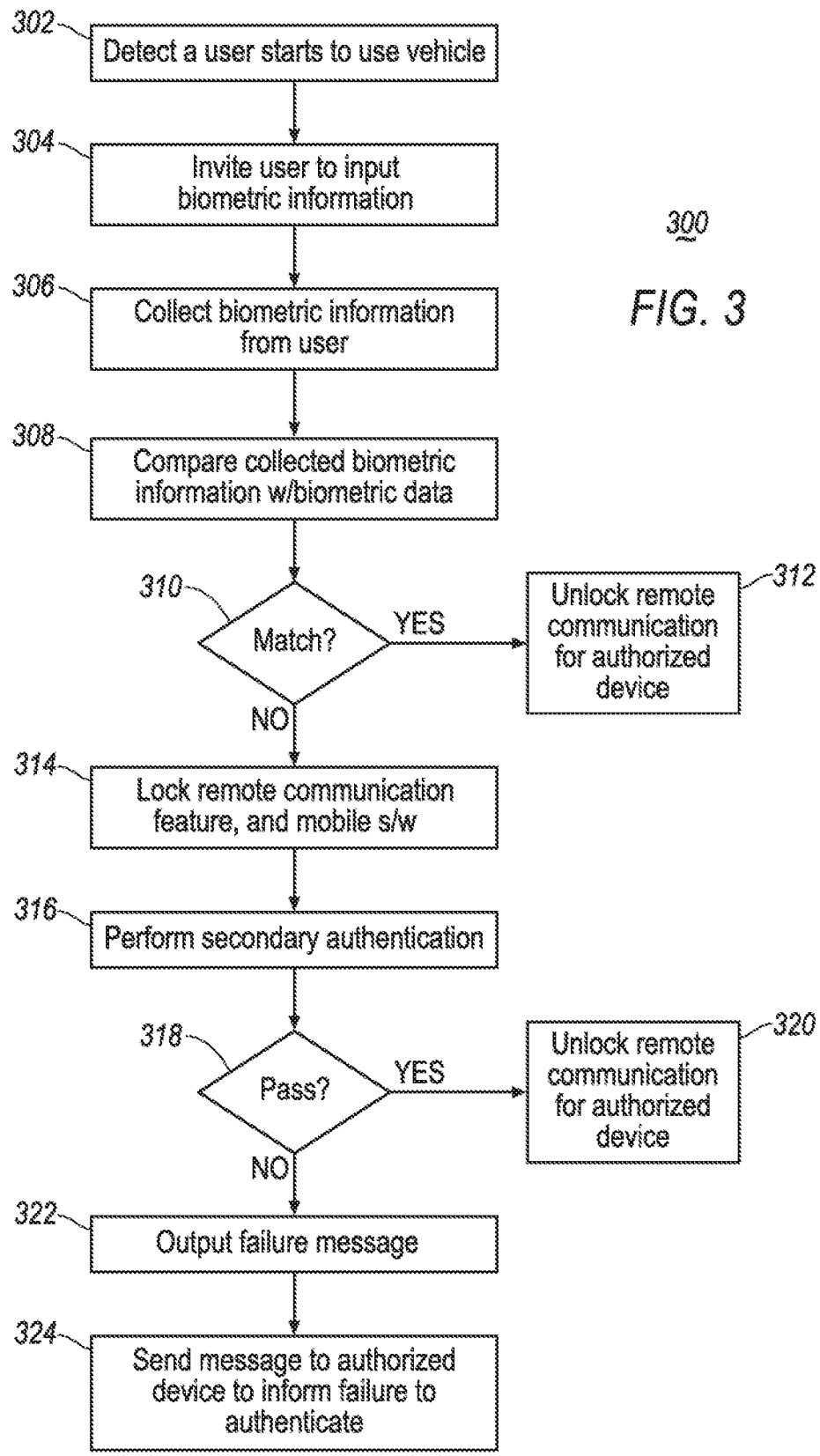
FIG. 3 illustrates an example flow diagram for a process of one embodiment of the present disclosure.

Referring to FIG. 3, an example flow diagram for a user verification process 300 of one embodiment of the present disclosure is illustrated. At operation 302, the computing platform 104 detects a user starts to use the vehicle 102. For instance, the computing platform 104 may detect the vehicle is being started by a user by pushing a start button or turning a key (not shown). Alternatively, the computing platform 104 may detect the vehicle transmission has been shifted from Park to Drive (or Reverse) to determine the users starts to use the vehicle 102. Responsive to detecting the vehicle starts to be used, at operation 304, the computing platform 104 invites the user to input biometric information to perform the user authentication. The computing platform 104 may output a video or audio message via the display 116 or the speaker 122 to ask the user to use one or more of the biometric sensors 172 to verify his/her identity. At operation 306, the authorization controller or the computing platform 104 collects the user input via one or more of the biometric sensors 172. In some cases, the biometric information may have already collected via one or more of the biometric sensors at operation 302 when the computing platform detects the vehicle starts to be used. For instance, if the fingerprint sensor 178 is integrated with the push to start button or a transmission selector, the computing platform 104 or the authorization controller 174 may collect the fingerprint when the button or selector is being touch by the user. In this case, operations 304 and 306 may be skipped.

At operation 308, the computing platform 104 compares the collected biometric information with the encrypted biometric data 182 stored in the secured storage 184 to verify the identity of the current vehicle user. Additionally or alternatively, operation 308 may be performed by the authentication controller 174 in addition to, or in lieu of by the computing platform 104. If a match is found in the biometric data, the process proceeds from operation 310 to operation 312, and the computing platform 104 unlocks/enables the remote communication feature to communicate with the authorized device 128 associated with the matching biometric data 182. Otherwise, if the computing platform 104 and/or the authentication controller 174 fails to detect matching biometric data 182, the process proceeds to operation 314 and the computing platform 104 locks/disables the remote communication feature and prohibits vehicle data/command 202 communication with the mobile device 128 previously paired and authorized by the vehicle 102. In addition, the computing platform sends a lockup signal to the mobile device 128 via the communication network 164 to lock the remote communication software 144 of the mobile device 128. In the lockup mode, the remote communication feature on the mobile device 128 is disabled, and the secondary authentication feature is enabled to provide an option to unlock the software 144.

At operation 316, the computing platform 104 performs a secondary authentication to further verify if the mobile device 104 is still authorized. The secondary authentication may be designated to provide an option to unlock the remote communication feature in case that the mismatch is detected in error. The secondary authentication may be performed in various ways. In general, the secondary authentication may require an interaction between the computing platform 104 and the mobile device 128 to verify the association still exist. As a few non-limiting examples, the secondary authentication may be performed by requiring the user to input an actual number displayed on the vehicle odometer to mobile device 128 to verify the association. Additionally or alternatively, the computing platform 104 may be configured to generate a security code and require the user to enter the security code in the software as one of the mobile applications 144 of the mobile device 128 to perform the secondary authentication. Additionally or alternatively, the computing platform 104 may require the user to scan a barcode (e.g. a quick response (QR) code) using the software of the mobile device 128 via a camera (not shown).

If the user successfully completes the secondary authentication at operation 316, the process proceeds from operation 318 to operation 320 and the computing platform unlock both the remote communication feature and the mobile software 144 of the mobile device 128. Otherwise, if the user fails to pass the secondary authentication, the process proceeds to operation 322 and the computing platform 104 outputs a failure message to the vehicle user indicative of the remote communication feature has been locked. In addition, at operation 324, the computing platform 104 sends a message to the mobile device previously paired with the vehicle 102 to inform the failure to authenticate.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. A vehicle, comprising:
one or more controllers, programmed to
responsive to detecting a mismatch between a biometric information of a user collected via a biometric sensor and a biometric record, send a lockup signal to a mobile device enrolled with the vehicle to lock an application; and responsive to successfully performing an authentication through an interaction with the application in a lockup mode, send an unlock signal to the mobile device to unlock the application.

2. The vehicle of claim 1, wherein the one or more controllers are further programmed to:

responsive to detecting a mismatch between a biometric information input by a user and a biometric record, lock a communication feature of the vehicle, wherein the communication feature is configured to communicate vehicle data and commands between the vehicle and the mobile device.

3. The vehicle of claim 2, wherein the one or more controllers are further programmed to:

responsive to successfully performing an authentication through an interaction with the application in a lockup mode, unlock the communication feature of the vehicle.

4. The vehicle of claim 1, wherein the authentication includes to:

display a barcode indicative of a security code via a display;

prompt the user to scan the barcode via the application in the lockup mode using the mobile device; and receive a message containing the security code from the mobile device.

5. The vehicle of claim 1, wherein the authentication includes to:

display a current measurement associated with the vehicle via a display;

prompt the user to input the current measurement via the application in the lockup mode using the mobile device; and receive a message containing the current measurement from the mobile device.

6. The vehicle of claim 1, wherein the authentication includes to:

display a security code generated via the one or more controllers via a display;

prompt the user to input the security code via the application in the lockup mode using the mobile device; and receive a message containing the security code from the mobile device.

7. The vehicle of claim 1, wherein the biometric record is encrypted and stored in a secured storage.

8. The vehicle of claim 1, wherein the biometric sensor includes at least one of: a camera configured to capture a facial information of the user, a fingerprint reader configured to scan a fingerprint of the user, or a retina scanner configured to scan a retina information of the user.

9. The vehicle of claim 1, wherein the one or more controllers are further programmed to:

responsive to detecting the vehicle starts to be used by the user, automatically collect the biometric information of the user.

10. A method for a vehicle, comprising:

responsive to detecting a mismatch between a biometric information of a user collected via a biometric sensor and a biometric record, locking a remote communication feature and sending a lockup signal to a mobile device enrolled with the vehicle to lock an application; and responsive to successfully performing an authentication through an interaction with the application in a lockup mode, unlocking the remote communication feature and sending an unlock signal to the mobile device to unlock the application.

11. The method of claim 10, further comprising:

responsive to detecting the vehicle starts to be used by the user, automatically collecting the biometric information of the user.

12. The method of claim 10, further comprising:

displaying a barcode indicative of a security code via a display;

prompting the user to scan the barcode via the application in the lockup mode using the mobile device; and receiving a message containing the security code from the mobile device.

13. The method of claim 10, further comprising:

displaying a current measurement via an odometer;

prompting the user to input the current measurement via the application in the lockup mode using the mobile device; and receiving a message containing the current measurement from the mobile device.

14. The method of claim 10, further comprising:

displaying a security code via a display;

prompting the user to input the security code via the application in the lockup mode using the mobile device; and receiving a message containing the security code from the mobile device.

15. The method of claim 10, wherein the biometric record is encrypted and stored in a secured storage.

16. The method of claim 10, wherein the biometric sensor includes at least one of: a camera configured to capture a facial information of the user, a fingerprint reader configured to scan a fingerprint of the user, or a retina scanner configured to scan a retina information of the user.

17. A non-transitory computer-readable medium comprising instructions that, when executed by a processor of a vehicle, cause the vehicle to:

responsive to detecting a mismatch between a biometric information of a user collected via a biometric sensor and a biometric record, lock a remote communication feature and send a lockup signal to a mobile device enrolled with the vehicle to lock an application; and responsive to successfully performing an authentication through an interaction with the application in a lockup mode, unlock the remote communication feature and send an unlock signal to the mobile device to unlock the application.

18. The non-transitory computer-readable medium of claim 17, further comprising instructions that when executed by the processor of the vehicle, cause the vehicle to:

output a security information associated with the vehicle;

prompt the user to input the security information via the application in the lockup mode using the mobile device; and receive a message containing the security information from the mobile device.

19. The non-transitory computer-readable medium of claim 17, wherein the biometric record is encrypted and stored in a secured storage.

20. The non-transitory computer-readable medium of claim 17, wherein the vehicle includes a camera configured to capture a facial information of the user, a fingerprint reader configured to scan a fingerprint of the user, or a retina scanner configured to scan a retina information of the user.

* * * * *